US005166301A

United States Patent [19]

Jacobs

[11] Patent Number: 5,166,301

[45] Date of Patent: Nov. 24, 1992

[54] COMPOSITION DISPENSING SYSTEM

[76] Inventor: Richard Jacobs, 3813 San Felipe Ave., Newbury Park, Calif. 91230

[21] Appl. No.: 410,748

[22] Filed: Sep. 22, 1989

Related U.S. Application Data

[62] Division of Ser. No. 161,908, Feb. 29, 1988, Pat. No. 4,869,400.

[51] Int. Cl.[5] ............ C08G 18/70

[52] U.S. Cl. ............ 528/67; 528/65; 528/76; 528/77; 528/83; 528/15; 528/335; 222/137

[58] Field of Search ............ 528/67, 65, 76, 77, 528/83, 15, 48, 335; 222/137; 521/117

[56] References Cited

U.S. PATENT DOCUMENTS 3,475,266 10/1969 Strassel ............ 521/109
4,748,192 5/1988 Smith ............ 521/107
4,859,735 8/1989 Cung Vu ............ 528/65
4,869,400 9/1989 Jacobs ............ 222/137
5,059,672 10/1991 Engebretson ............ 528/60

*Primary Examiner*—John Kight, III
*Assistant Examiner*—Duc Truong
*Attorney, Agent, or Firm*—Louis J. Bachand

[57] ABSTRACT

A composition is provided adapted for a dual chamber (12, 14) applicator 10 having a common mixing zone 42, the composition comprising a low viscosity side A liquid mixture of a hydroxyl functional moiety component and at least two isocyanate components thixatropically reactive with amines, and a side B of at least two amines differentially reactive with said isocyanates in side A for a reaction first to a relatively low viscosity mass and thereafter to a relatively high viscosity mass as a function of time in passing through and then out of the applicator mixing zone 42.

11 Claims, 1 Drawing Sheet

10
12
14
16
18
20
22
24
26
28
30
32
34
36
38
40
42
44
48
50
52
54
56
58
59
60
62
64
66
4

COMPOSITION DISPENSING SYSTEM

This application is a division of my copending application Ser. No. 07/161,908, filed Feb. 29, 1988, now U.S. Pat. No. 4,869,400.

TECHNICAL FIELD

This invention has to do with a dispensing system for compositions of various uses where application of a reactive polymeric composition is needed with the advantages of timed reactivity for easy expression of the material as a pre-paste from a dispensing applicator sequenced with immediate development of true paste level viscosities enabling sag-free adhesion of the composition to the substrate. The invention has particular application to auto body repair, and pertains particularly to a system for the rapid, facile, effective application of large or small quantities of high bond strength repair compositions onto auto body parts with accuracy, freedom from sagging on vertical surfaces, and consistency application after application.

In its broader aspects the invention provides a uniquely combined applicator apparatus and composition formulation for the delivery to substrates of materials for bonding, sealing, filling and/or repairing articles such as car body parts, for providing window sealants, refrigerant adhesives for large body panels, weatherstripping and particularly in its cellular polymer as; ects for other applications where insulating, cushioning, sound damping, vibration damping, flotation and like properties are needed.

In its more specific aspects the invention provides an applicator with expression means and mixing means for delivery of a composition mixed from reactive components onto a substrate over a predetermined through-time in the applicator, and a composition having a two-stage reaction mode such that low viscosity and thus easy expressibility is maintained over the predetermined through-time while the composition is mixed and reacted in the applicator, and yet a thixatropic viscosity is realized immediately thereafter as the composition is placed on the part so that the composition does not sag or run, even on vertical surfaces. Selection of compos' tion components complements the delivery apparatus such that the rate of reactivity of the composition from liquid to pre-paste stages corresponds to the rate of delivery from the apparatus so that delivery is easy by simple hand pressure, yet a composition thick enough to stand on a vertically disposed substrate is realized immediately beyond the apparatus nozzle.

BACKGROUND OF THE INVENTION

Auto body assembly and repair is a vast market for sealant, bonding and filler chemicals, particularly as urethane, vinyl, polyester, epoxy and other plastics are used in place of metal in an increasing number of auto body parts. In the repair field it is necessary to put the repair compositions in a variety of places, including on vertical surfaces, such as installed bumpers and around windshield openings, with precision. Moreover, different quantities of the compositions must be delivered, including relatively large quantities which are inconvenient to deliver from a succession of small applicators. Existing designs of dispensers and dispensible compositions however are required to be small because the force required to operate them with even small quantities of material is at the human limit, so that dispensers of larger quantities would simply be inoperative or have elaborate, expensive leverage systems that would wear so quickly as to be practically useless to the commercial user such as a body shop.

SUMMARY OF THE INVENTION

It is an object of the present invention to provide a composition dispensing and delivery system in which an applicator of a new design is combined with compositions specifically tailored for the applicator to give the optimum balance of delivery volume, rate, non-sagging, and bond strength. It is another object to provide a two-part chemical composition, based on urethane chemistry, which flows and mixes readily in the applicator for ease of delivery and sets up free of sagging immediately upon being dispensed. Yet another object is to provide an applicator of rugged, trouble-free design for mixing and dispensing the repair compositions with minimum effort and substantial absence of such backpressure as makes operation difficult and wears out the dispensing mechanism.

These and other objects of the invention are met through provision of a composition dispensing system including an applicator for dispensing a chemical composition having a side A or first side and a side B or second side which are reactive during a predetermined first time period after first intermixing, to a relatively low viscosity mass and thereafter during a second time period reactive to a relatively high viscosity mass, the applicator comprising elongated first and second chambers adapted respectively to separately contain the first and second sides of the composition, means to drive the composition sides from the chambers in reactive proportions including a pair of pistons mounted to be driven simultaneously against both the composition sides, a common outward passage from the first and second chambers for receiving the first and second composition sides and having internal baffles adapted and arranged to repeatedly divide and recombine the sides until achievement of a homogeneous reaction mass, the passage being of a length relative to the rate at which the composition sides are driven from the chambers through the passage such that the dwell time of the composition in the passage is substantially equal to the first time period, whereby the composition is a runny fluid reaction mass of relatively low viscosity easy to express from the applicator while in the common passage and a non-runny higher viscosity reaction mass immediately beyond the common passage.

As illustrated by a preferred composition, that of a urethane polymer formed from a side A comprising an aliphatic isocyanate prepolymer, a polyol, and an aromatic isocyanate, and a side B comprising a polyol, and two differentially rate reactive amines with respect to the aromatic isocyanate on side A, the invention enables a first, pre-paste-forming initial reaction of involving preferentially only the first, rapid-acting amine reactant within the applicator, which reaction product is fluent and easily expressed from the applicator, and a second paste-forming reaction involving the second, less rapidly reacting amine which can begin within the applicator but typically takes place substantially outside of the applicator.

BRIEF DESCRIPTION OF THE DRAWINGS

The invention will be further described as to an illustrative embodiment in conjunction with the attached drawing in which.

PREFERRED MODES

Figures 1, 2, 3, 4:
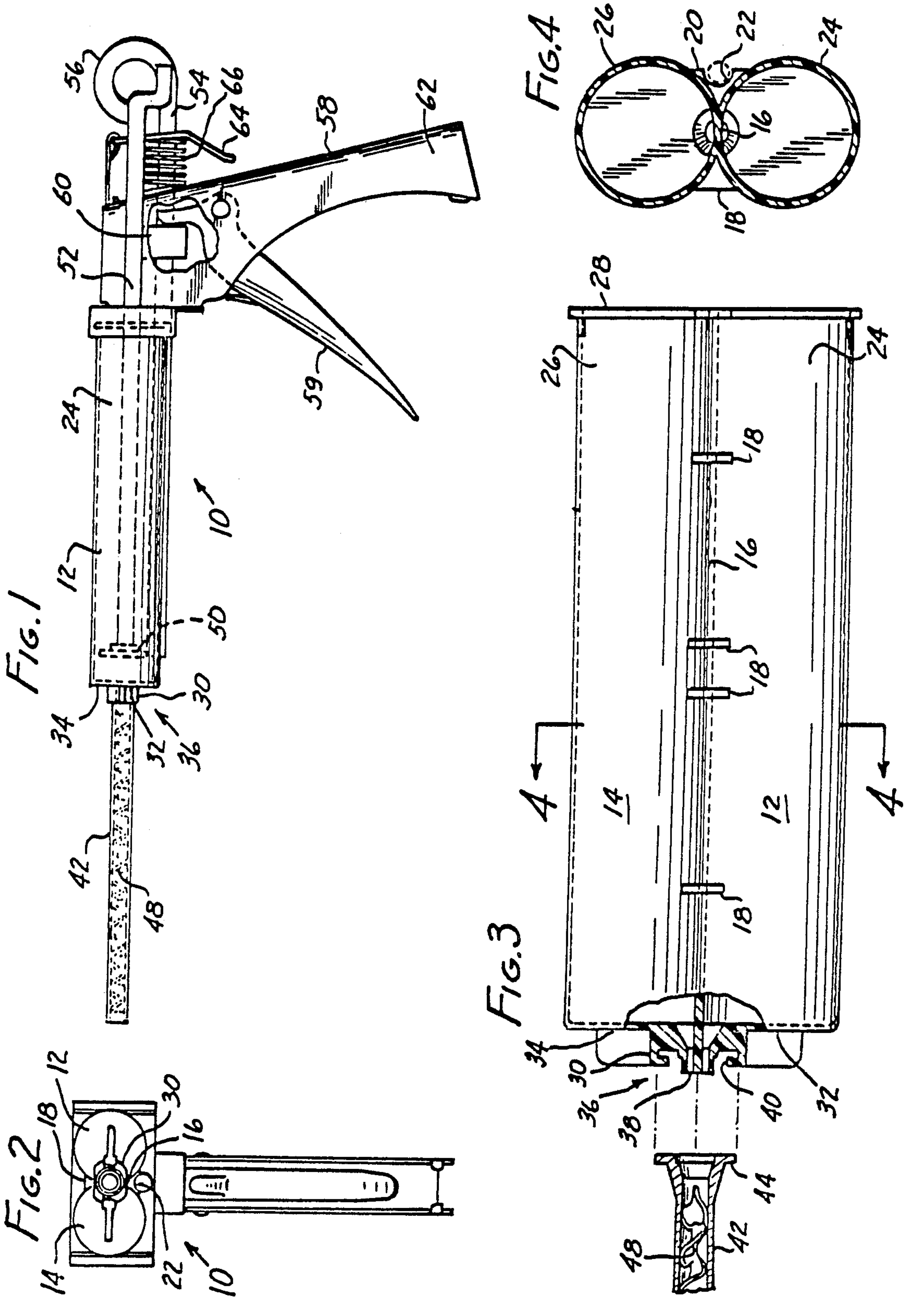
FIG. 1 is a side elevation view of the applicator according to the invention, partly broken away to show underlying parts.
FIG. 2 is front elevation view thereof.
FIG. 3 is a top plan view of the chambers and outward common passage tube of the applicator; and, FIG. 4 is a view taken on line 4—4 in FIG. 3.

With reference to the drawings in detail, the applicator is shown at 10 in FIGS. 1 and 2. The applicator 10 comprises a first chamber 12 and a second chamber 14 which are formed of tubular plastic elements which of like length and diameter, parallel and touch each other tangentially at 16, as best shown in FIG. 3 and 4. Chambers 12, 14 are typically formed together and supported by webs 18, 20 above and below the chambers. Webs 20 are radiused at 22 for purposes to appear. The walls 24, 26 of chambers 12, 14, are rearwardly flanged at 28 and forwardly jointly define an outward continued wall extent 30. Surrounding wall 30 and surmounting the forward ends 32, 34 of the chambers 12, 14, is a flanged boss 36 which forms a nozzle 38 common to both chambers, and beyond the nozzle a mounting structure 40 for a reactant mixing tube 42. The tube 42 includes a flange 44; the mounting structure 40 being cooperatively notched at 46 to receive the flange 44 in bayonet locking relation so that the tube 42 can be easily mounted and dismounted.

The tube 42, which is known per se, contains a series of internal baffles 48 which are set at angles to each other in a manner to repeatedly divide and recombine material flowing through the tube.

Each of chambers 12, 14 contain a piston 50. The pistons 50 are yoked together by being carried on side rods 52 which in turn are fixed to a center rod 54. Rod 54 terminates rearwardly in a finger grip pull handle 56. The chambers 12, 14 rest upon the rod 54 with the webs 22 contoured around the rod by virtue of radiusing at 22. A handle 58 having a pull trigger 59 journals the center rod 54 as shown for incremental advance by friction shoe 60 which is pushed forward by boss 61 on trigger 59 responsive to pulling the trigger relative to the handle grip 62 in conventional manner. Advance of the center rod 54 carries with it advance of the side rods 52 and thus the pistons 50. Material disposed in the chambers 12, 14 is accordingly expressed from the chambers, through the nozzle 38 and into the tube 42. In the tube 42, the materials from the respective chambers 12, 14 are intimately blended into a homogeneous mass. The materials in the respective chambers 12, 14 being reactive, the result is a well-mixed, reactive mass in which the reaction is rapid and uniform.

As shown, the chambers 12, 14 are of like diameter and length as is appropriate for materials whose sides A and B are to be mixed in like volumes. The chambers 12, 14 can be varied in size both absolutely and relatively for other than one-to-one volume reactive materials.

It is a signal feature of the present invention that greater sizes of chambers 12, 14 can be used beyond the 1.6 ounce conventional size, e.g. up to 6 ounces for windshield sealant applications and beyond that up to 128 ounce sizes for large volume body shop applications. Size flexability is the result of eliminating the back-pressure problems of previous systems which limited the amount of material that could be practically expressed. With the present system, the reactants are a liquid at the outset, and have readily handled resistance through the mixing tube 42, and only thereafter assume such stiff body that they would be difficult to express, but then they are already outside of the applicator 10.

The applicator 10 has a latch 64 which locks the center rod 54 against retreat unless the latch is pushed forward against biasing spring 66 centered on the rod, whereupon the rod may be readily withdrawn and new chambers 12, 14 placed on the rod for renewed application of material.

Compositions specifically tailored to be delivered by the just described applicator are provided by the the invention. As noted above, the compositions are sequentially reactive to different stages of viscosity by virtue of incorporation of at least two different amines having different rates of reaction with the aromatic isocyanate component of the polymer. In this manner, ready flow is maintained through the applicator, but non-sagging of the material is also realized in the as-applied condition.

Accordingly, the invention provides a chemical composition having first and second sides (side A, side B) which are reactive during a predetermined first time period after first intermixing to a relatively low viscosity mass and thereafter during a second time period reactive to a relatively high viscosity mass. The passage through the applicator, from the point of intermingling the side A and side B portions of the material, is set at a length which in relation to the rate at which the composition sides are driven from the chambers 12, 14 through the mixing tube 42 is such that the dwell time of the composition in the passage is substantially equal to the first time period. In this manner the composition is a runny, fluid reaction mass going to a paste of relatively low viscosity and relatively easy to express from the applicator 10 while in the tube 42 and a non-runny near paste of higher viscosity immediately beyond the end of tube 42. Passage times through the tube 42 are typically two seconds.

This combination of sequential reactivities and time dependent viscosities is realized with a chemical composition having sides which are liquids of substantially equal, low viscosities. Preferably, the chemical composition is a urethane polymer, in which polymer side A comprises a liquid mixture of an aliphatic isocyanate prepolymer component, a hydroxyl functional moiety component, and an aromatic isocyanate component thixatropically reactive with aliphatic amines in side B of the polymer in five seconds or less. The polymer may further include a silane coupling agent in the range of 0.1 to 50% by weight of the side A mixture, e.g. selected from isocyanato-, epoxo-, hydroxyl-, sulfhydryl-, active hydrogen-, and amine-functional silaning agents, and typically present in an amount from 2 to 10% by weight of the side A mixture.

The aliphatic isocyanate prepolymer component is preferably selected from methylenedicyclohexane diisocyanate, isophorone diisocyanate, and hexamethylene diisocyanate and is present in an amount of 1% to 20% by weight of the side A mixture.

The aromatic isocyanate component is preferably selected from diphenylmethane diisocyanate, toluene diisocyanate, and prepolymers and quasi-prepolymers of these diisocyanates and typically present in an amount of 3% to 10% by weight of the side A mixture.

In particularly preferred systems the aromatic issocyanate component is selected from 4,4' diphenylmethane diisocyanate, toluene diisocyanate, and prepolymers and quasi-prepolymers of the diisocyanates and is present in an amount of 3% to 10% by weight of the side A mixture.

Preferably, the hydroxyl functional moiety component is selected from polyether polyols. polyester polyols, tetramethyleneoxide ether polyols, hydroxyl functional vinyl-addition polyols based on ethylene containing monomers, castor oils and hydroxyl-functional castor oil derivatives, and di- and multi-functional, hydroxyl-, sulfhydryl-, and active-hydrogen bearing oligomers having molecular weights from 25 to 25,000 daltons. For example, typically, the hydroxyl functional moiety component is selected from polyether polyols. polyester polyols, tetramethyleneoxide ether polyols, hydroxyl functional vinyl-addition polyols based on ethylene containing monomers, castor oils and hydroxyl-functional castor oil derivatives, and di- and multi-functional, hydroxyl-, sulfhydryl-, and active-hydrogen bearing oligomers having molecular weights from 25 to 25,000 daltons.

In particularly preferred systems, the hydroxyl functional moiety component is a di-functional or tri-functional polyether polyol having a molecular weight of from 50 to 10,000 daltons, e.g. a polyoxypropylene ether glycol.

Or, the hydroxyl functional moiety component is a polyester polyol, such as and preferably diethyleneglycol adipate polyester polyol.

In other systems, the hydroxyl functional moiety component is a tetramethyleneoxide ether polyol, is a hydroxyl-functional vinyl-addition polyol based on an ethylene containing monomer, such as those based on butadiene, acrylic acid, acrylic ester or methacrylic ester ethylene containing monomer.

In other systems, the hydroxyl functional moiety component is selected from castor oil and hydroxyl functional castor oil derivatives, or a di- or multi-functional, hydroxyl-, sulfhydryl-, and active-hydrogen bearing oligomer having a molecular weight from 25 to 5,000 daltons.

The several classes of hydroxyl functional moieties named above can be used separately or in any combination depending on the requirements of the application, for example for lower water content, use of the castor oil moiety is desirable.

In the invention the urethane polymer side B typically comprises a liquid mixture of a hydroxyl functional moiety component, an aromatic primary or secondary amine chain extender, and an aliphatic primary or secondary amine thixatropically reactive with aromatic isocyanates in side A of the polymer in five seconds or less.

Accordingly, typically, the hydroxyl functional moiety component is selected from polyether polyols, polyester polyols, castor oils and hydroxyl functional castor oil derivatives, tetramethylene oxide ether polyols, and hydroxyl functional vinyl-addition polyols, specified above in connection with the side A mixtures.

Characteristically, the aromatic amine in side B is slower reacting with aromatic isocyanates present in the side A than the aliphatic amines present in side B and requires at least 2 seconds to so react, the common outward passage dwell time being less than 2 seconds, whereby the side B aromatic amine does not react with side A aromatic isocyanate before the mixed side A and side B are expressed from the applicator common passage. In particular formulations, the aromatic amine is reactive with the aromatic isocyanates between 20 seconds and one hour after mixing in the common outward passage so that there is no reaction in the applicator.

Preferred characteristics of the aromatic amine include having the amine functionality of the aromatic amine on the same aromatic ring, and there being but a single aromatic ring. Highly particularly preferred as the aromatic amine is 3,5 diethyl-2,4-toluene diamine, Amicure 101 (ex Air Products and Chemicals Inc., Allentown, Pennsylvania), and 3,5 methylthio-2,4-toluene diamine. Typically, the aromatic amine is present in an amount of from 0.1 to 50% by weight of the side B mixture, preferably from 5 to 15% by weight of the side B mixture, and most preferably in such amount that the equivalents of the aromatic amine present in side B are equal to the equivalents of aromatic isocyanate present in side A.

In another system, the urethane polymer side B comprises a liquid mixture of a hydroxyl functional moiety component, a hydroxyl functional chain extender, rather than the primary or secondary amine chain extender, and an aliphatic primary or secondary amine thixatropically reactive with aromatic isocyanates in side A of the polymer in five seconds or less. In this embodiment a typical hydroxyl functional chain extender is butanediol or bis(2-hydroxyethyl)-hydroquinone ether.

Further characteristics of the side B aliphatic amine component is that its amine functionality is unhindered for fast reactivity with the aromatic isocyanate in the side A mixture and preferably it has a molecular weight less than 1500 daltons. Further the amine is preferably a diamino alkane or an alkyl, alkoxy, aryl, aroyl, or alicyclic substituted diamino alkane, e.g. ethylene diamine, propylene diamine, butylene diamine, pentanemethylene diamine, hexamethylene diamine, methylpentamethylene diamine, n-aminoethylpiperazine, 1,3-bis-(aminoethyl) cyclohexane, and m-xylenediamine. Preferably, the aliphatic amine is present in an amount of from 0.1% to 20% by weight of the side B mixture, and particularly in an amount of from 2% to 6% by weight of the side B mixture. It is highly preferred to have the equivalents of the aliphatic amine present in side B mixture substantially equal to the equivalents of aromatic isocyanate present in the side A mixture.

In certain compositions it is desirable to have reaction promoters present, and accordingly there may be included on the B side an organo-metallic or amine promoter for the reaction of the isocyanates in the side A mixture with active hydrogen present in the side B mixture, e.g. an organo-tin compound such as Witco UL-6 or dibutyl tin dilaurate, an organo-bismuth compound such as Nuodex Nu-xtra (24% bismuth by weight), and Coscat 83, also 24% bismuth by weight, an organo-lead compound, an organo-mercury compound such as phenyl mercuric proprionate, or tin/amine complex.

Particularly where adhesion to glass is desired as in windshield sealants, or where foaming sufficient to give a cellular product is desired, as in sound damping situations, water can be added to the formulation of side B, typically in an amount effective to produce cellularity in the urethane polymer, and preferably in an amount between 0.3% and 1% by weight based on the weight of the side B.

Where the side A mixture contains a silane coupling agent in an amount from 2% to 10% by weight, there is preferably included also in the side B mixture water in an amount effective to hydrolyze the silanes to silanols for improved glass adhesion. Useful silanes include isocyanato-n-propyl-triethoxy silane, bis(2-hydroxyethyl)-3-aminopropyl triethoxysilane, 3-mercaptopropylmethyldimethoxysilane, 3-amino-propyl-triethoxysilane, n-2amino-ethyl-3-aminopropyl trimethoxy silane, 2□3,4-epoxy-cyclohexyl-ethyltrimethoxysilane, and glycidopropyltrimethoxysilane.

EXAMPLE

To 24.1 parts by weight of methane-dicyclohexyl diisocyanate was added 61.5 parts of 6000 molecular weight polyoxypropylene ether polyol and the mixture was heated at 300° F. for 2 hours under nitrogen. The solution was cooled to room temperature and 9:0 parts of diphenylmethane diisocyanate, 5 parts isocyanato-1-propyl triethoxy silane, and 0.4 parts of carbon black were added, blended with a stirrer blade and vacuum processed to less than 50 mm. Hg. for one hour. The resulting side A product was packaged in one side of a dual six ounce plastic chamber assembly. Side B was prepared by blending at room temperature 85.2 parts 6000 molecular weight polyoxypropylene ether polyol, 10 parts diethyltoluene diamine, 4 parts m-xylene diamine, 0.8 parts organo-bismuth, and 0.5 part water. After degassing for 15 minutes the product was placed in the other side of the dual chamber assembly. The product was tested by expressing against a vertically disposed window glass. Expression was easy with simple hand pressure. The aliphatic amine immediately reacted to increase the liquid material viscosity but the viscosity reached a plateau during the two second dwell in the dispenser. After dispensing the aromatic amine became reactive and a paste was formed as described. The extrudant did not have any graininess, gelatinous character, or any other negatives. The paste of a ⅜ths diameter bead hung perfectly without sagging from a vertical and an overhead surface. It was flattened against glass in order to simulate the process of being squeezed between the windshield and the frame. It was flattened to a dimension of ½ inch wide by ⅛th inch thick. The length was 5 inches. The paste had a 45 minute working time. Within another 15 minutes, the paste was tack-free and cured enough that it was integral and rubbery. It cured within 4 hours to produce a rubber of 50 Shore A, and cured overnight to produce a 70 Shore A elastomer. The elastomer did bond to glass. The strip did peel away with resistance from adhesion to the glass only when it was pulled in a 180 degree direction with a strong pull. Part of the strip tore before it was peeled off.

I claim:

1. Composition comprising low viscosity side A and side B of a urethane polymer which are reactive during a predetermined first time period after first intermixing to an to an increased bu relatively low viscosity mass adapted to be readily expressed through a mixing zone confining said sides during said first time period and thereafter during a second time period reactive to a relatively high viscosity mass adapted to support itself on a vertical surface substantially commencing with its exit from said mixing zone, said side A comprising an aliphatic isocyanate component, an aromatic isocyanate component and a hydroxyl functional moiety component, and said side B comprising primary or secondary aliphatic and aromatic amines reactive with said Side A aliphatic isocyanate component and substantially not with said aromatic isocyanate during said first time period to form said low viscosity mass and then with said side A aromatic isocyanate component during said second time period to form said high viscosity mass.

2. Composition according to claim 1, in which said side A hydroxyl functional moiety component is selected from castor oil and hydroxyl functional castor oil derivatives.

3. Composition according to claim 1, in which said urethane polymer side A comprises a liquid mixture of an aliphatic isocyanate prepolymer component, a hydroxyl functional moiety component, and an aromatic isocyanate component thixatropically reactive with said amines in side B of said polymer in five seconds or less.

4. Composition according to claim 3, in which said aromatic isocyanate component is present in an amount of 1% to 20% by weight of said side A mixture.

5. Composition according to claim 4, in which said aromatic isocyanate component is selected from diphenylmethane diisocyanate, toluene diisocyanate, and prepolymers and quasi-prepolymers of said diisocyanates.

6. Composition according to claim 5 in which said aromatic isocyanate component is present in an amount of 3% to 10% by weight of said side A mixture.

7. Composition according to claim 3, in which said aromatic isocyanate component is selected from 4,4′ diphenylmethane diisocyanate, toluene diisocyanate, and prepolymers and quasi-prepolymers of said diisocyanates and is present in an amount of 3% to 10% by weight of said side A mixture.

8. Composition according to claim 3, in which said hydroxyl functional moiety component is selected from polyether polyols, polyester polyols, tetramethyleneoxide ether polyols, hydroxyl functional vinyl-addition polyols based on ethylene containing monomers, castor oils and hydroxyl-functional castor oil derivatives, and di- and multi-functional, hydroxyl-, sulfhydryl-, and active-hydrogen bearing oligomers having molecular weights from 25 to 25,000 daltons.

9. Composition according to claim 6, in which said hydroxyl functional moiety component is selected from polyether polyols, polyester polyols, tetramethyleneoxide ether polyols, hydroxyl functional vinyl-addition polyols based on ethylene containing monomers, castor oils and hydroxyl-functional, hydroxyl-sulfhydryl, and active-hydrogen bearing oligomers having molecular weights from 25 to 25,000 daltons.

10. Composition according to claim 7, in which said hydroxyl functional moiety component is selected from polyether polyols, polyester polyols, tetramethyleneoxide ether polyols, hydroxyl functional vinyl-addition polyols based on ethylene containing monomers, castor oils and hydroxyl-functional castor oil derivatives, and di- and multi-functional, hydroxyl-, sulfhydryl-, and active-hydrogen bearing oligomers having molecular weights from 25 to 25,000 daltons.

11. Composition adapted for a dual chamber applicator having a common mixing zone, said composition having a low viscosity urethane polymer side A comprising a liquid mixture of a hydroxyl functional moiety component, an aliphatic isocyanate prepolymer component, and an aromatic isocyanate component thixatropically reactive with amines, and a side B comprising an aromatic primary or secondary amine differentially reactive with said isocyanates in side A for a reaction first with said aliphatic isocyanate prepolymer component within 5 seconds to a relatively low viscosity mass and thereafter with said aromatic isocyanate component within 20 seconds to one hour to a relatively high viscosity mass.

* * * * *